United States Patent [19]

Wen et al.

[11] Patent Number: 4,964,278

[45] Date of Patent: Oct. 23, 1990

[54] METHOD OF SEPARATING CONDENSIBLE VAPORS FROM PARTICLES IN HIGHLY COMPRESSED GASES

[75] Inventors: Horng-Yuan Wen, Brookfield; Hwa-Chi Wang, Downers Grove; Stephen Chesters, Chicago, all of Ill.

[73] Assignee: American Air Liquide, Countryside, Ill.

[21] Appl. No.: 318,828

[22] Filed: Mar. 6, 1989

[51] Int. Cl.$^5$ .............................................. B01D 8/00
[52] U.S. Cl. ........................................ 62/55.5; 55/82; 55/269; 73/863.12
[58] Field of Search .................. 62/55.5; 73/863.11, 73/863.12, 863.21, 863.22; 55/82, 269

[56] References Cited

U.S. PATENT DOCUMENTS

| | | | |
|---|---|---|---|
| 4,023,398 | 5/1977 | French et al. | 62/55.5 |
| 4,506,513 | 3/1985 | Max | 55/269 |
| 4,530,250 | 7/1985 | Gay et al. | 73/863.12 |
| 4,668,261 | 5/1987 | Chatzipetros et al. | 62/55.5 |

*Primary Examiner*—Ronald C. Capossela
*Attorney, Agent, or Firm*—Oblon, Spivak, McClelland, Maier & Neustadt

[57] ABSTRACT

A method is described to remove condensible vapors in highly compressed gases without affecting the original particle spectra and concentrations. The vapors are separated from particles primarily through diffusion mechanism and collected on cold surfaces. Four important parameters are the length, the flow rate, the temperature, and the diffusion coefficients of the vapors to be removed. Important applications include sampling particles from high pressure gases and condensible vapor-free filling for ultra-pure cylinder gases.

7 Claims, 4 Drawing Sheets

4,964,278

METHOD OF SEPARATING CONDENSIBLE VAPORS FROM PARTICLES IN HIGHLY COMPRESSED GASES

BACKGROUND OF THE INVENTION

1. Field of the Invention:

The invention relates to the removal of condensible vapors in gases.

2. Discussion of the Background:

In many applications of gases, such as the manufacture of VLSI chips, high purity gases are needed during the manufacturing process to avoid, among others, the creation of defects during the various masking steps of the process. Avoiding such defects enhances the manufacture output of the process as well as the reliability of the chips. There is also a need for high purity gases in the optical, aerospace and pharmaceutical industries.

Various impurities such as particles or vapors may be present in compressed gases stored in a container such as a cylinder. It is known from the article entitled "A gas filtration system for concentrations of $10^5$ particles/cm$^3$" from G. Kasper and H.Y. Wen; published in Aerosol Science and Technology 5: 167–185 (1986), that "totally" particle-free process gases may be obtained. Particle analysis has been also carefully studied by the same authors and the results of this study has been published in the Proceedings—*Institute of Environmental Sciences*—May 6, 1987—in an article entitled "Particle Analysis in cylinder gases".

Trace quantities of condensible vapors such as hydrocarbons or fluorinated hydrocarbons in gases are commonly detected and quantified by a variety of means such as chromatography in the gas phase, infrared (IR) absorption spectroscopy, mass spectrometry, total hydrocarbon detectors, etc.

Pressure reduction by critical orifice is commonly used in pressure regulators. For the purpose of sampling particles from compressed gases of pressure up to 500 psi, a pressure reducer, consisting of a clean orifice, a chamber into which the gas can expand, and a means to sample part of the expanding jet, can achieve "zero" particle shedding. Such a unit can be purchased from Liquid Air Corporation.

It is known that very high concentration of fine particles can be generated during the pressure reduction process if the upstream pressure exceeds a few hundred psi depending on the gas purity (*J. Aerosol Sci.*, 19, 153, 1988). The particle concentration decreases with decreasing upstream pressure and drops to zero typically at pressures within the range of 300 to 600 psi. It is documented that these particles are formed from condensation of trace amount of vapor impurities in the compressed gases.

The removal of vapor impurities (purification) is conventionally accomplished with the help of molecular sieve or activated carbon. This approach however which may totally distort the original particle spectra and concentrations in the compressed gases.

Utilization of the differences in diffusion coefficients to remove unwanted nitric acid vapor from a gas stream to obtain true particulate nitrate is a common practice among air pollution researchers, where it is called "acid denuder". A basic coating is usually applied to the collection surfaces to retain the acid vapors, which may shed significant particles to upset the purpose of sampling particles from high-purity gases. The system is at ambient pressure. No temperature control is provided.

In view of the considerable demand for high purity gases and high purity gases containing particles there is therefore a strongly felt need for a method for separating condensible vapors from particles in a highly compressed gas. Such a method would ideally not affect the spectra or concentration of the particles in the compressed gas.

It is also known from U.S. Patent Applications Ser. Nos. 107,173 now U.S. Pat. No. 4,878,570 and U.S. Patent Application Ser. No. 107,177, both filed Oct. 13, 1987, and incorporated herein by reference, to generate droplets of condensible vapors in a carrier gas through a critical orifice and to discharge a carrier gas containing condensible vapors through a plurality of orifices without causing the condensation of the condensible vapors.

SUMMARY OF THE INVENTION

Accordingly, it is an object of this invention to provide a process for removing condensible vapors from a compressed gas.

It is another object of this invention to provide a process for removing condensible vapors from a compressed gas containing particles.

It is another object of this invention to provide a process for removing condensible vapors from a compressed gas containing particles, without affecting the spectra or concentration of these particles in the compressed gas.

The inventors have now discovered a process which satisfies these objects of this invention, and other objects which will become apparent from the description of the invention given hereinbelow.

In the process of the present invention, a starting compressed gas containing condensible vapors and particles is passed through a flow system. The flow system used comprises simple geometries and polished, clean surfaces. The flow rate of the compressed gas through the flow system and the flow system geometry are selected such that particles having a diameter greater than 0.01 micrometers have a collision efficiency of less than 5% with the flow system surfaces and condensible vapor molecules have a collision efficiency of at least 98% with the flow system surfaces. The temperature of the flow system surfaces is then controlled to retain collided vapor molecules on the surfaces. This process produces a product compressed gas which is free of condensable vapors and contains the spectra and concentration of particles of the starting compressed gas.

BRIEF DESCRIPTION OF THE FIGURES

A more complete appreciation of the invention and many of its attendant advantages will be readily obtained as the same becomes better understood by reference to the following detailed description when considered in connection with the accompanying figures, wherein.

DETAILED DESCRIPTION OF THE PREFERRED EMBODIMENTS

The invention provides a process for removing trace amount of condensible vapor impurities from highly compressed gases without disturbing the original particle size spectra and concentrations in the compressed gas. These condensible vapors can convert into particles under conditions of large temperature drop or pressure drop and totally distort the original particle information.

In accordance with the present invention, compressed gases are defined as comprising, among others, a carrier gas and condensible vapors. The compound gases may have pressures ranging from 100 to 3000 psia. The carrier gas may be, e.g. nitrogen ($N_2$), argon, helium, carbon dioxide, carbon monoxide, hydrogen, methane, ethane, propane, etc.

Condensible vapors are defined for the present purposes as species which will condense to form droplets upon sufficient cooling of the carrier gas or upon contacting a sufficiently cool surface (vide infra), e.g. $C_{5-16}$ hydrocarbons or $C_{5-16}$ fluorinated hydrocarbons, etc., and higher hydrocarbons or fluorinated hydrocarbons which can include up to $C_{30}$ hydrocarbons/fluorinated hydrocarbons under some circumstances, such as when these vapors are present in a very low concentration. These condensible vapors are however present in their gaseous state before cooling and not as droplets.

The method of the invention thus distinguishes itself from other detection methods for preexisting particles and specifically from methods for the detection of preexisting oil droplets in gases which require the preexistence of such droplets. An example of such methods is given in U.S. Patent application Ser. No. 801,305, G. Kasper et al.

The present invention provides for the removal of either global amounts of condensible vapors or individual components within a "family" of such species (for example hydrocarbons).

Figure 1:
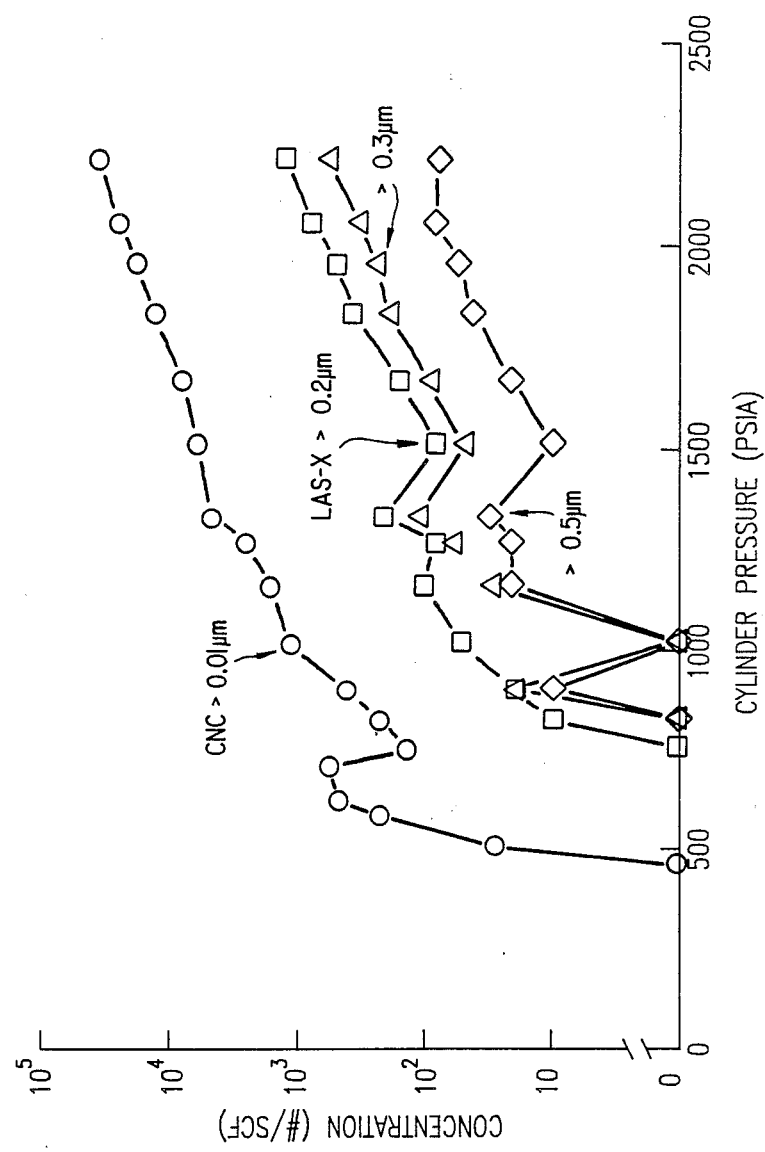
FIG. 1 illustrates background particle levels generated by condensation as a function of the cylinder (gas) pressure.

One important application of the method of this invention, in conjunction with a critical orifice pressure reducer, is the analysis of particles present in highly compressed gases, e.g. cylinder gases. Such particle analysis is of critical importance to a variety of industrial processes that utilize ultra-pure, compressed gases and is a major topic of research on microcontamination. However, there is no current practical means for this particle analysis from compressed gases of pressure greater than 700 psi because particles generated from condensible vapors during pressure reduction are usually orders of magnitude more numerous than the original particles (FIG. 1).

Another important application of the present invention is that this method can be used for the purpose of purification of gases, especially during the cylinder filling process, to obtain ultra-clean gases. The present method is superior to conventional method in "zero" particle generation and low pressure drop.

The invention removes condensible vapors in a flow system of simple geometries and of polished, clean surfaces, such as an electro-polished round tube, an annular tube, or a rectangular slit. The term "simple geometries" is used to indicate that these flow systems do not have sharp turns and/or dead spaces to trap particles.

It is well documented that particle loss can be significant in a flow system with complex geometry. The polished, clean surface of the flow systems used in this invention can prevent particle shedding or reentrainment, which is well recognized as a significant problem for rough surfaces.

The conventional vapor removing process (usually referred to as purification) utilizes complex flow systems with rough surfaces and porous pellets which can generate or trap substantial amount of particles. This conventional process is therefore not compatible with particle sampling and analysis.

The particles contained in the compound gases treated in this invention have diameters of at least 0.01 $\mu$m. The invention selectively removes condensible vapor molecules without affecting the particles in the gas stream.

It is well known that the diffusion coefficients for gas molecules are orders of magnitude larger than those of particles. For example, the diffusion coefficient for air molecules is 0.19 $cm^2 sec^{-1}$ versus 0.00052 $cm^2 sec^{-1}$ for particles of 0.01 $\mu$m diameter. (Note: 0.01 $\mu$m is currently the practical lower limit of detection by commonly used particle counters. The diffusion coefficient decreases further with increasing particle diameter.)

Accordingly, the collision frequency with the tube walls is much higher for vapor molecules than for particles. For convenience, we define the collision efficiency (CE) as the fraction of the species of interest that collide with the walls.

By proper selection of flow rate, tube geometry, and tube length, it is possible to devise a system with negligible collision efficiency (e.g., 5%) for particles greater than 0.01 $\mu$m while having nearly 100% (e.g., >98%) collision efficiency for vapor molecules.

The collision efficiency in laminar flow can be calculated from

| | |
|---|---|
| $CE = 5.50 K^{\frac{2}{3}} - 3.77 K$ | for $K < 0.007$ |
| $CE = 1 - 0.819 \exp(-11.5 K)$ | for $K > 0.007$ |
| where | |
| $K = DL/Q$ | for round tube |
| $K = DLW/QH$ | for rectangular slit | where D is the diffusion coefficient, L the tube length, Q the flow rate, W the width of the slit, and H the height of the slit.

Tables 1 to 3 list the collision efficiency in a round tube for various tube lengths, flow rates, and diffusion coefficients. The range of diffusion coefficients covers most commonly encountered vapor species. The last row of each table indicates the diffusion loss of 0.01 $\mu$m particles. The loss decreases with increasing particle size.

TABLE 1

| | L = 30 cm | | | |
|---|---|---|---|---|
| | Q (L/m) = | | | |
| D ($cm^2$/s) | 1 | 5 | 10 | 20 |
| 0.2 | 0.987 | 0.642 | 0.459 | 0.334 |
| 0.1 | 0.897 | 0.459 | 0.334 | 0.268 |
| 0.05 | 0.709 | 0.334 | 0.268 | 0.222 |
| 0.0005 (0.01 $\mu$m) | 0.048 | 0.017 | 0.011 | 0.007 |

TABLE 2

| D (cm²/s) | L = 60 cm Q (L/m) = | | | |
|---|---|---|---|---|
| | 1 | 5 | 10 | 20 |
| 0.2 | 1.000 | 0.844 | 0.642 | 0.459 |
| 0.1 | 0.987 | 0.642 | 0.459 | 0.334 |
| 0.05 | 0.897 | 0.459 | 0.334 | 0.268 |
| 0.0005 (0.01 μm) | 0.075 | 0.026 | 0.017 | 0.011 |

TABLE 3

| D (cm²/s) | L = 90 cm Q (L/m) = | | | |
|---|---|---|---|---|
| | 1 | 5 | 10 | 20 |
| 0.2 | 1.000 | 0.932 | 0.763 | 0.560 |
| 0.1 | 0.998 | 0.763 | 0.560 | 0.400 |
| 0.05 | 0.963 | 0.560 | 0.400 | 0.299 |
| 0.0005 (0.01 μm) | 0.097 | 0.034 | 0.022 | 0.014 |

The present process retains the collided vapor molecules on the tube walls by controlling the wall temperature. When vapor molecules collide with the wall, the molecules may stick or rebound depending upon the physical and chemical interactions occurring between the vapor and the collection surface. Conventional purification process rely on the adsorption properties of the collection surface to retain vapor molecules.

In the present invention the sticking probability of the colliding molecules is increased by decreasing the surface temperature. As the surface temperature decreases systematically, different species of trace vapors can be selectively removed. The temperature control can be obtained by a mechanical refrigerator or a reservoir of dry ice or liquid nitrogen. The suitable temperature ranges lies between the boiling point of the gas to be sampled and the lowest boiling point of the condensible vapors to be removed. In the present invention, at least a portion of the surface sufficient to trap the condensible vapors must be cooled.

The invention further provides a process for identifying the species of vapor impurities in cylinder gases. After trapping an adequate amount of vapor impurities, heated, clean gases can be directed through the tube to desorb the trapped vapors. Fourier transform infrared spectroscopy (FTIR), gas on-line to identify the species of the trapped vapors.

Figure 2:
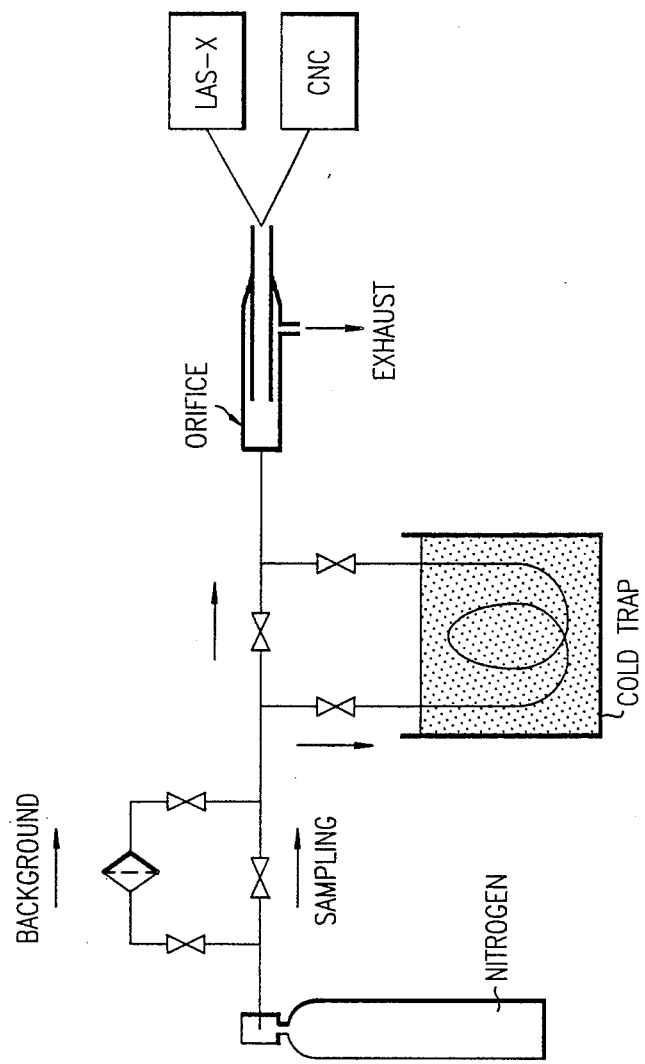
FIG. 2 provides a schematic illustration of a design useful for particle sampling from high pressure gas cylinders.

FIG. 2 shows the schematic design for the application of sampling particles from cylinder gases. The tube length and the temperature control method employed here only serve as an example. A ¼ inch SSEP tubing of 4 feet long submerged in a dry ice-freon reservoir served as the vapor removing device (cold trap). The temperature of the cold trap was −78° C. The required tube length can be found in Table 1 to 3 for different applications. With this design, the background particle levels, generated from reentrainment and condensation, were controlled well.

The temperature control can be facilitated by a mechanical freezer, a jet-expansion device, or a reservoir filled with different liquefied gases.

The detected background particle concentration with an absolute filter in-line but by-passing the cold trap is given in FIG. 1, which illustrates background particle levels, generated by condensation, as a function of cylinder (gas) pressure. FIG. 1 illustrates that particle concentration increases with cylinder pressure. The CNC counts are two orders of magnitude higher than the LAS-X counts. The detected background particle concentration with the cold trap is given in Table 4. The background level can be further reduced by employing a lower flow rate, a longer tube in the cold trap, or a lower reservoir temperature.

Figure 3:
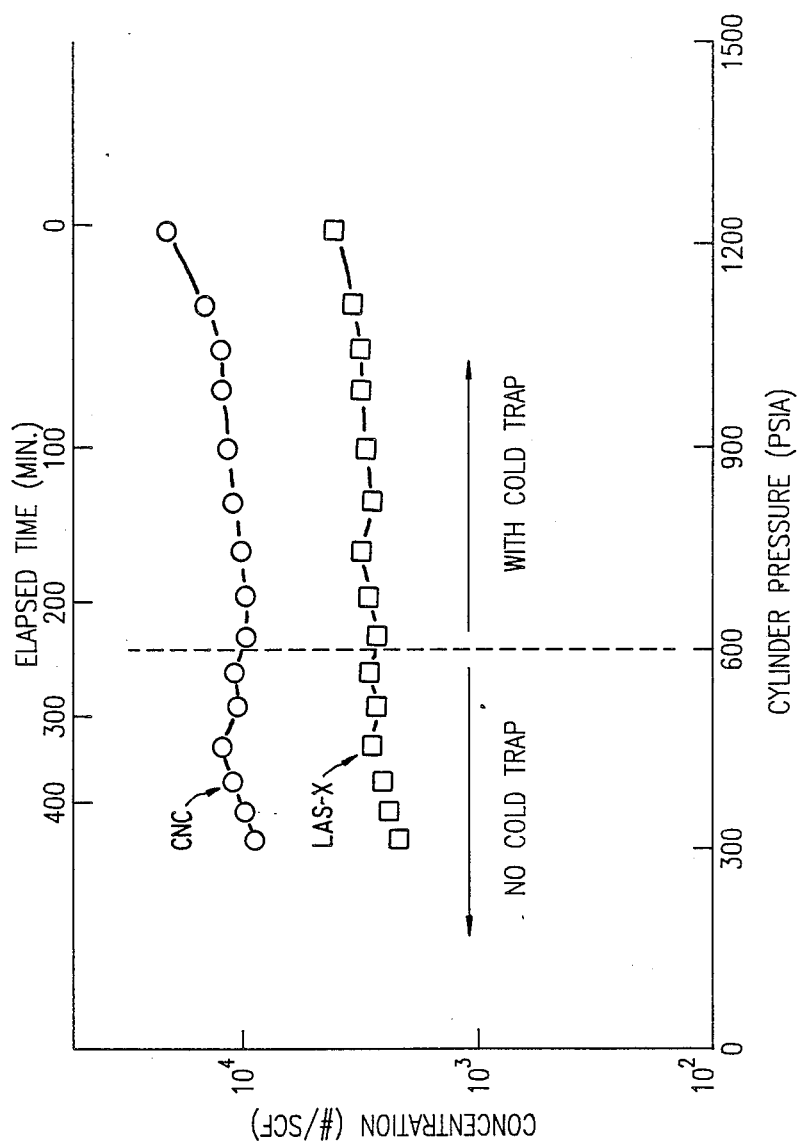
FIG. 3 provides a comparison of particle concentration below 600 psia and above 600 psia, showing no particle loss due to the use of a cold trap in the system.

FIG. 3 shows that the use of a cold trap does not cause extra particle loss. FIG. 3 provides particle concentration data for a turbulently filled cylinder. The concentration of the particles remains the same with and without the cold trap at pressures less than 600 psi, where no condensation occurs.

Figure 4:
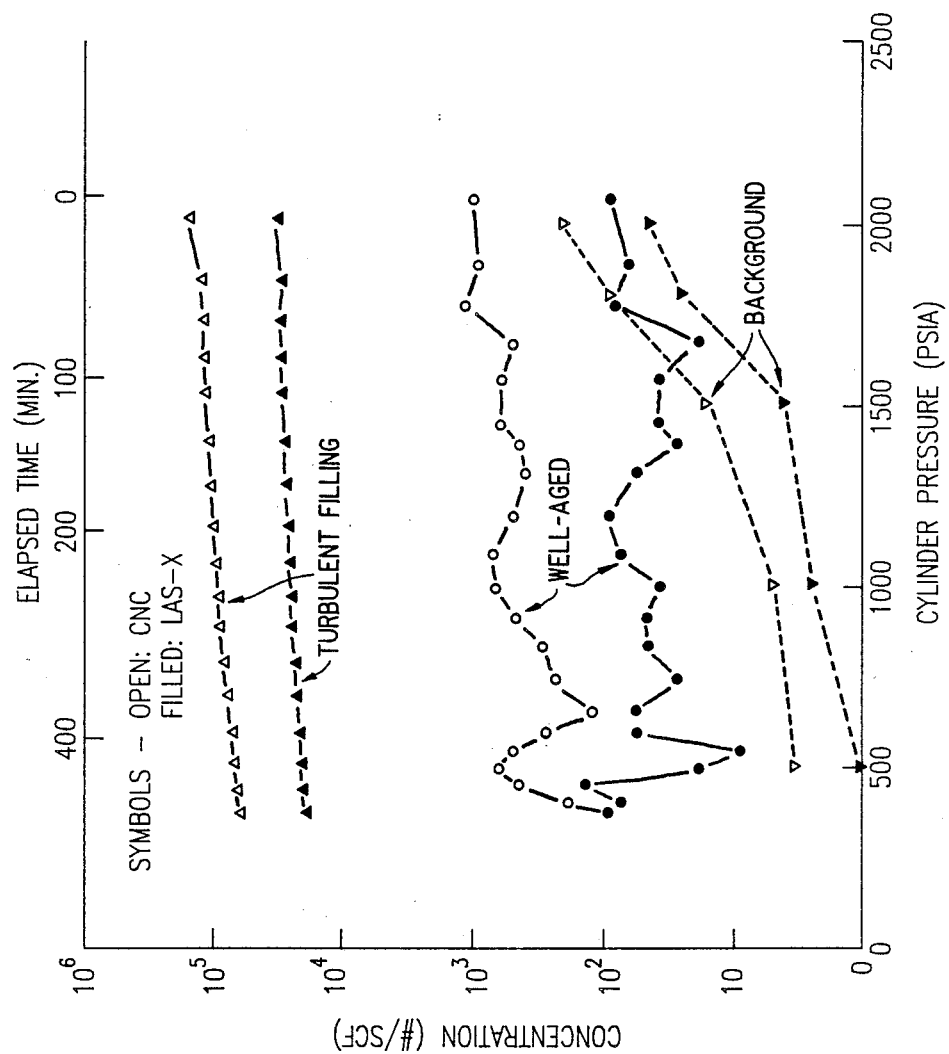
FIG. 4 provides particle concentration data in high pressure gas cylinders with different histories.

FIG. 4 shows examples of measuring true particle concentration in turbulent-filled and aged cylinders by employing the present method. FIG. 4 provides particle concentrations for high pressure gases in cylinders with different histories.

As this graph illustrates, the concentration of particles can be different by two orders of magnitude depending on the history of the high pressure gas in the cylinder. Notably, with well-aged high pressure stored under high pressure in cylinders and undisturbed for at least one month), the concentration of particles is relatively low. As seen from a comparison of the two curves provided in FIG. 4 for particle concentrations in well-aged high pressure gas cylinders, without the present invention, it is not possible to measure the particle content of a gas obtained from a well-aged cylinder at pressures greater than 1,000 psia (see FIG. 1).

TABLE 4

| | Achievable Particle Background With a Filter and a Cold Trap | | | |
|---|---|---|---|---|
| Test Pressure (PSIA) | CNC | LAS-X | | |
| | >0.01 μm Particles/ scf | >0.2 μm Particles/ scf | >0.3 μm Particles/ scf | >0.5 μm Particles/ scf |
| 500 | 3.2 | 0 | 0 | 0 |
| 1000 | 4.8 | 2.4 | 2.4 | 0 |
| 1500 | 16 | 4.0 | 1.3 | 0 |
| 1800 | 90 | 25 | 14 | 3.1 |
| 2000 | 209 | 46 | 25 | 9.2 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for removing condensible vapor from a compressed gas containing condensible vapors and particles without affecting the spectra or concentration of said particles in said compressed gas, said process comprising:
   (i) passing a starting compressed gas containing condensible vapors and particles through a flow system comprised of simple geometries and polished, clean surfaces;
   (ii) selecting (iia) a compressed gas flow rate through said flow system and (iib) a flow system geometry, such that particles having a diameter greater than 0.01 μm have a collision efficiency of less than 5% with said flow system surfaces and condensible vapor molecules have a collision efficiency of at least 98% with said flow system surfaces;
   (iii) controlling the temperature of least a portion of the surfaces of said flow system to retain collided vapor molecules on said portion of the surfaces; and (iv) obtaining a product compressed gas free of condensible vapors and containing the spectra and concentration of particles of said starting compound gas.

2. The process of claim 1, wherein said condensible vapors comprises a hydrocarbon or a fluorinated hydrocarbon.

3. The process of claim 1, comprising charging a cylinder with said product compressed gas.

4. A compressed gas obtained by a process, comprising:
   (i) passing a starting compressed gas containing condensible vapors and particles through a flow system comprised of simple geometries and polished, clean surfaces;
   (ii) selecting (iia) a compressed gas flow rate through said flow system and (iib) a flow system geometry, such that particles having a diameter greater than 0.01 $\mu$m have a collision efficiency of less than 5% with said flow system surfaces and condensible vapor molecules having a collision efficiency of at least 98% with said flow system surfaces;
   (iii) controlling the temperature of at least a portion of the surfaces of said flow system to retain collided vapor molecules on said portion of the surfaces; and
   (iv) obtaining a product compressed gas free of condensible vapors and containing the spectra and concentration of particles of said starting compressed gas.

5. The compressed gas of claim 4, wherein said condensible vapors comprises a hydrocarbon.

6. A process for identifying the species of condensible vapor impurities in a compressed gas, comprising:
   (i) passing a starting compressed gas containing condensible vapors through a flow system comprised of simple geometries and polished, clean surfaces;
   (ii) selecting (iia) a compressed gas flow rate through said flow system and (iib) a flow system geometry, such that particles in said gas and having a diameter greater than 0.01 $\mu$m have a collision efficiency of less than 5% with said flow system surfaces and said condensible vapor molecules have a collision efficiency of at least 98% with said flow system surfaces;
   (iii) controlling the temperature of at least a portion the surfaces of said flow system to retain collided vapor molecules on said portion of the surfaces;
   (iv) replacing said starting compressed gas passing through said flow system with a clean gas and desorbing said retained vapor molecules; and
   (v) identifying the vapor molecules.

7. A process for the analysis of particles present in a compressed gas, comprising:
   (i) passing a starting compressed gas containing condensible vapors and particles through a flow system comprised of simple geometries and polished, clean surfaces;
   (ii) selecting (iia) a compressed gas flow rate through said flow system and (iib) a flow system geometry, such that particles having a diameter greater than 0.01 $\mu$m have a collision efficiency of less 5% with said flow system surfaces and condensible vapor molecules have a collision efficiency of at least 98% with said flow system surfaces;
   (iii) controlling the temperature of at least a portion of the surfaces of said flow system to retain collided vapor molecules on said portion of the surfaces;
   (iv) obtaining a product compressed gas free of condensible vapors and containing the spectra and concentration of particles of said starting compressed gas; and
   (v) analyzing the particles present in said product compressed gas.

* * * * *